Patented Feb. 24, 1953

2,629,493

UNITED STATES PATENT OFFICE 2,629,493

CONCENTRATION OF OXIDIZED IRON ORES BY FROTH FLOTATION IN THE PRESENCE OF CARBOHYDRATE XANTHATES

Earl H. Brown, Hibbing, Minn., assignor to Attapulgus Minerals & Chemicals Corporation, a corporation of Maryland No Drawing. Application November 8, 1951, Serial No. 255,521

5 Claims. (Cl. 209—166)

This invention relates to the concentration of oxidized iron ores and particularly to the concentration of finely-divided low-grade iron ores in which the iron is present as one of the several oxides of iron or as the carbonate of iron, and in which the gangue is siliceous.

The method of the present invention may be considered to be an improvement on the method described in Patent No. 2,364,777, issued December 12, 1944, to Earl H. Brown and Francis X. Tartaron, assignors to Minerals Separation North American Corporation, predecessor of the assignee of the present application. That patent describes a method of concentrating finely-divided oxidized iron ores in which the gangue ingredient is principally quartz, which consists in treating an aqueous pulp of such an ore with an anionic collecting agent selected from the class consisting of higher fatty acids and resin acids, mixtures of fatty and resin acids and soaps of these acids, and with cooperating agents consisting of a calcium compound such as lime, and an aqueous solution of gelatinized starch; followed by subjecting the thus treated ore pulp to froth-flotation treatment and removing the quartz-containing froth, thereby producing in the residue of the pulp an oxidized-iron concentrate.

The present invention is the result of the discovery that the concentration of finely-divided low grade iron ores of the kind above mentioned may be effected, with important economy in the reagents employed, by froth-flotation treatment after conditioning an aqueous pulp of such an ore with an anionic collecting agent, and with cooperating agents consisting of a calcium compound which is an activator for quartz, and an aqueous solution of a xanthate of a carbohydrate from the group of carbohydrates consisting of starch, cellulose and dextrin. Such froth-flotation treatment results in a siliceous froth which is discarded, thereby producing in the residue of the pulp an oxidized iron concentrate.

The anionic collecting agent employed may be of any well-known kind, preferably selected from the class consisting of higher fatty acids and resin acids and mixtures of fatty and resin acids and soaps thereof. In the examples hereinafter given the soap used was made by the neutralization with caustic alkali of a mixture of fatty and resin acids derived from paper pulp manufacture and known as "Liqro."

The calcium compound which is an activator for quartz, useful in the method of the present invention, includes (for example) calcium oxide (lime), calcium chloride, calcium fluoride, calcium nitrate, calcium oxalate, calcium silicate, calcium sulfate, calcium cyanide, calcium hypophosphate, calcium diphosphate, calcium sulfide, calcium hydroxide and Portland cement. Because of its cheapness, lime is preferred as the activator for the quartz, in practicing the methods of the present invention; and lime was employed in the examples hereinafter given.

The xanthates of a carbohydrate from the group of carbohydrates consisting of starch, cellulose and dextrin, which have been found to be particularly useful in practicing the method of the present invention are sodium and potassium starch xanthates, sodium cellulose xanthate and sodium dextrin xanthate, all of which may be produced by the methods (for example) which will be hereinafter described in the examples given. Such xanthates may be used in their impure as well as in their purer forms, a fact that makes them particularly useful in the economical practicing of the invention.

The following examples illustrate the successful practicing of the invention on finely-divided oxidized iron ores in the form of washer plant tailings and taconite, both from the Mesabi range, employing sodium starch xanthate, potassium starch xanthate, sodium cellulose xanthate and sodium dextrin xanthate. The descriptions of these examples will contribute to a full understanding of the method of concentrating finely-divided oxidized iron ores according to the present invention.

Example 1

This example describes the making of a sodium potato-starch xanthate, and its use in the concentrating of the finely-divided oxidized iron ore in a washer plant tailing.

The sodium starch xanthate was prepared in the following way: To 10.8 grams of potato starch were added 25 grams of carbon disulfide to make a thin slurry. To this slurry in a stoppered bottle 50 cubic centimeters of a 16% sodium hydroxide solution were quickly added, and the bottle was rotated at room temperature for 5 hours. This produced an orange-yellow gummy mass which was removed from the bottle, and the large excess of carbon disulfide was poured off. More of the carbon disulfide was then removed from the gummy mass by suction. The product thus obtained was dissolved in cold water, and the xanthate was precipitated in denatured alcohol. The gummy precipitate thus obtained was washed several times with alcohol, and finally with ether. After air-drying at room temperature, the precipitate was broken up in a mortar to a fine canary-yellow powder which was the desired sodium starch xanthate.

The sodium starch xanthate thus obtained was used in practicing the invention in the following manner: An aqueous pulp of a 500 gram charge of oxidized iron tailings (dry weight) from an iron ore washing plant was ground in a laboratory rod mill at 50% solids until all the pulp passed a 65-mesh screen. The minus 65 mesh material thus obtained was then conditioned with the following reagents: sodium potato starch xanthate 1.50 lbs.; lime 4.50 lbs.; "Liqro," fatty and resin acid soap, 0.7 lb.; all per ton of solids in the pulp which had a pH value of 11.5. The thus conditioned ore pulp was subjected to flotation treatment at about 10% solids for about 7 minutes, thereby producing a rougher siliceous froth-product which was discarded, and a machine discharge product containing most of the oxidized iron minerals. The metallurgical results were as follows:

| Products | Percent Wt. | Percent Fe | Percent SiO₂ | Percent Recovery | |
|---|---|---|---|---|---|
| | | | | Fe | SiO₂ |
| Feed | 100.0 | 27.67 | 53.05 | 100.0 | 100.0 |
| Froth Product | 63.0 | 10.74 | 78.25 | 24.5 | 92.9 |
| Machine Discharge | 37.0 | 56.49 | 10.14 | 75.5 | 7.1 |

It will be understood that the results given in the foregoing table might have been improved as regards recovery by cleaning the froth product. However, the results given show the successful practicing of the invention employing sodium potato starch xanthate.

*Example 2*

This example describes the making of a sodium corn-starch xanthate, and its use in practicing the invention on an iron oxide tailing from an iron ore washer plant.

The sodium starch xanthate was prepared in the following manner: To 20.1 grams of a commercial corn-starch, 3.6 grams of sodium hydroxide was added as a 1% solution in an open beaker with constant stirring. After a few minutes, 1.3 grams of carbon disulfide was added and the stirring was continued for about 2 hours. This reaction product containing sodium starch xanthate was used in making a 2.5% aqueous solution, based on the weight of the chemicals entering the reaction.

The feed to the flotation operation was 500 grams of minus 65 mesh material which was obtained by grinding an iron oxide tailing obtained from an iron ore washing plant. This feed was conditioned in an aqueous pulp at about 10% solids with the following reagents: Sodium starch xanthate 2.25 lbs.; lime 6.0 lbs.; "Liqro" soap 0.7 lb.; all per ton of solids in the feed; thereby producing a conditioned pulp having a pH value of 11.5. The thus conditioned pulp was subjected to froth-flotation treatment, thereby producing a froth-product high in silica, and a machine discharge product containing most of the oxidized iron minerals. The metallurgical results are given in the following table:

| Products | Percent Wt. | Percent Fe | Percent SiO₂ | Percent Recovery | |
|---|---|---|---|---|---|
| | | | | Fe | SiO₂ |
| Feed | 100.0 | 27.77 | 53.05 | 100.0 | 100.0 |
| Froth Product | 55.2 | 4.03 | 88.37 | 8.0 | 92.0 |
| Machine Discharge | 44.8 | 57.03 | 9.54 | 92.0 | 8.0 |

The excellent results are evident from the above table. Thus, this example shows the successful practicing of the invention by the use of a sodium corn-starch xanthate in its mother liquor, without subjecting it to precipitation as described in Example 1.

*Example 3*

This example shows the usefulness of the sodium corn-starch xanthate described in Example 2 when used in the concentration of a taconite ore.

The feed was a taconite ore from the western part of the Mesabi range in the form of a minus 20 mesh material which was ground in an aqueous pulp in a rod mill with intermediate screening at 100 mesh until all the ore passed the screen. The minus 100 mesh material thus obtained was conditioned in an aqueous pulp at about 10% solids with the following reagents: Sodium starch xanthate 1.0 lb.; lime 2.5 lbs.; "Liqro" soap 1.0 lb. which was added by stages; all per ton of solids in the feed; thereby producing a conditioned pulp having a pH value of 10.9. The thus conditioned pulp was subjected to froth-flotation treatment, thereby producing a froth-product high in silica, and a machine discharge product containing most of the oxidized iron minerals. The metallurgical results are given in the following table:

| Products | Percent Wt. | Percent Fe | Percent SiO₂ | Percent Recovery | |
|---|---|---|---|---|---|
| | | | | Fe | SiO₂ |
| Feed | 100.0 | 36.64 | 41.09 | 100.0 | 100.0 |
| Froth Product | 51.5 | 14.94 | 71.34 | 21.0 | 89.4 |
| Machine Discharge | 48.5 | 59.67 | 8.97 | 79.0 | 10.6 |

The excellent results shown by the above table indicate that the use of a refined corn-starch xanthate is not necessary.

*Example 4*

This example describes the making of a potassium starch xanthate from corn-starch, and its use in connection with a taconite ore in practicing the invention.

The potassium starch xanthate was prepared in the following way: A thin corn-starch slurry containing 20.1 grams dry weight of starch was added to a 5% potassum hydroxide solution containing 3.6 grams of potassium hydroxide, while stirring rapidly. After the starch was gelatinized, 1.3 grams of carbon disulfide was added, and the stirring was continued in an open beaker for 3 hours. The viscous lemon-colored solution thus obtained was diluted to a 2.5% aqueous solution based on the weight of the chemicals used, thereby providing a potassium corn-starch xanthate solution which was employed in practicing the invention in the following manner:

The feed was a taconite ore which was minus 20 mesh but was stage ground in a laboratory rod mill, with intermediate screening, until all the ore passed a 100 mesh screen. An aqueous pulp of this minus 100 mesh material was then conditioned with the following reagents: The potassium corn-starch xanthate (above described) 1.25 lbs.; lime 2.5 lbs.; "Liqro" soap 1.3 lbs. which was added in stages; all per ton of solids in the pulp which had a pH value of 10.9. The thus conditioned ore pulp was subjected to flotation treatment at about 10% solids, thereby producing a rougher froth-product high in silica, and a machine discharge product containing most of the oxidized-iron minerals. The metallurgical results were as follows:

| Products | Percent Wt. | Percent Fe | Percent SiO$_2$ | Percent Fe Recovery |
|---|---|---|---|---|
| Feed | 100.0 | 38.82 | | 100.0 |
| Froth Product | 49.1 | 17.62 | | 22.3 |
| Machine Discharge | 50.9 | 59.28 | 9.88 | 77.7 |

Of course, the results given in the foregoing table might have been improved as regards recovery by cleaning the froth-product but it is obvious that the results reported show the successful practicing of the invention employing potassium corn-starch xanthate.

Example 5

This example describes the making of a potassium potato-starch xanthate in powdered form, and its use in connection with a washer plant tailing.

The potassium potato starch xanthate was prepared in the following way: To 10.8 grams of potato starch, 25 grams of carbon disulfide were added to make a thin slurry. To this slurry in a stoppered bottle was added 50 cubic centimeters of a 16% potassium hydroxide solution, and the bottle was rotated at room temperature for about 5 hours. This produced an orange-colored gummy mass which was removed from the bottle, and the large excess of carbon disulfide was poured off; and more of the carbon disulfide was then removed by suction. The product thus obtained was dissolved in cold water, and the xanthate was precipitated in cold denatured ethyl alcohol; and the precipitate was washed with ethyl alcohol, followed by washings with ether. The washed precipitate thus obtained, after drying at room temperature, was broken up in a mortar to a fine yellow-colored powder. This powder was used in practicing the invention in the following manner:

The feed was an oxidized-iron ore in the form of tailings from an iron ore washer plant which were ground in an aqueous pulp in a laboratory rod mill at about 50% solids until all the pulp passed a 65 mesh screen. This minus 65 mesh material was conditioned with the following reagents: Potassium potato starch xanthate (obtained in the manner above described) 1.75 lbs.; lime 6.0 lbs.; "Liqro" soap 0.7 lb. which was added by stages; all per ton of solids in the pulp which had a pH value of 11.5. The thus conditioned ore pulp was subjected to froth-flotation treatment at 10% solids, thereby making a rougher froth-product high in silica and a machine discharge containing most of the iron minerals. The metallurgical results were as follows:

| Products | Percent Wt. | Percent Fe | Percent SiO$_2$ | Percent Fe Recovery |
|---|---|---|---|---|
| Feed | 100.0 | 27.41 | | 100.0 |
| Froth Product | 60.2 | 7.63 | | 16.8 |
| Machine Discharge | 39.8 | 57.32 | 8.20 | 83.2 |

A cleaning operation possibly might have improved the results as regards recovery; but the successful practicing of the invention employing potassium potato-starch xanthate is evident.

Example 6

This example describes the making of a sodium cellulose xanthate, and its use in practicing the invention on an iron oxide tailing obtained from an iron ore washer plant.

The sodium cellulose xanthate was prepared in the following manner: The cellulose employed consisted of 10 grams of Whatman's filter paper, cut into pieces about 5 millimeters square which were soaked for 3 hours in 200 cubic centimeters of 17.7% sodium hydroxide solution. The excess caustic solution was then poured off, and the cellulose was pressed to remove more of the solution, until the weight of the cellulose was reduced to 40 grams. This compact cellulose was shredded; and 5.7 grams of carbon disulfide were added to it in a stoppered bottle which was then rolled for about 4 hours and allowed to stand overnight. The reaction product thus obtained was dissolved in water, producing an orange-colored solution. A part of this solution was poured into a comparatively large quantity of methyl alcohol, which precipitated the cellulose xanthate, which was washed several times in alcohol and finally with ether.

The cellulose xanthate thus obtained was used in practicing the invention in the following manner: A 500 gram feed of tailings from an oxidized-iron ore washer plant was ground in an aqueous pulp in a laboratory rod mill until all of the pulp passed a 65 mesh screen. This minus 65 mesh material was then conditioned in a pulp containing about 10% solids with the following reagents: An aqueous solution of the said cellulose xanthate, 3.5 lbs.; lime 6.0 lbs.; "Liqro" soap 0.7 lb. which was added by stages; each per ton of solids in the pulp. The thus conditioned pulp was subjected to flotation treatment at about 10% solids thereby producing a rougher froth product high in silica and a machine discharge containing most of the iron minerals. The metallurgical results were as follows:

| Products | Percent Wt. | Percent Fe | Percent SiO$_2$ | Percent Fe Recovery |
|---|---|---|---|---|
| Feed | 100.0 | 28.37 | | 100.0 |
| Froth Product | 63.0 | 10.37 | | 23.0 |
| Machine Discharge | 37.0 | 59.03 | 7.83 | 77.0 |

As mentioned in connection with the previous tests, a cleaning operation might have improved results as regards recovery; but the successful practicing of the invention employing sodium cellulose xanthate is evident.

Example 7

In this example the sodium cellulose xanthate the making of which was described in Example 6 was employed in the treating of a taconite ore.

The feed was a 500 gram charge of minus 20 mesh taconite ore which was screened on a 100 mesh sieve, and the oversize was ground in a laboratory rod mill in an aqueous pulp at 50% solids until all of the particles in the pulp were finer than 100 mesh. The minus 100 mesh materials thus obtained were combined to make the feed; and this feed was conditioned in an aqueous pulp containing about 10% solids with the following reagents: Sodium cellulose xanthate, 1.7 lbs.; lime 2.6 lbs.; "Liqro" soap 0.7 lb. The thus conditioned pulp was subjected to froth-flotation treatment at about 10% solids for about 7 minutes, thereby producing a rougher froth product high in silica and a machine discharge containing most of the taconite mineral. The metallurgical results were as follows:

| Products | Percent Wt. | Percent Fe | Percent SiO₂ | Percent Fe Recovery |
| --- | --- | --- | --- | --- |
| Feed | 100.0 | 39.09 | | 100.0 |
| Froth Product | 53.4 | 21.23 | | 29.1 |
| Machine Discharge | 46.6 | 59.44 | 9.99 | 70.9 |

A cleaning operation would have improved the results as regards recovery; but the successful practicing of the invention employing cellulose starch xanthate is evident.

*Example 8*

This example describes the making of a sodium dextrin xanthate, and its use in practicing the invention on an iron oxide tailing obtained from an iron ore washer plant.

The sodium dextrin xanthate was prepared in the following manner: To 20.1 grams of a commercial dextrin 3.6 grams of sodium hydroxide was added as a 1% solution, in an open beaker with constant stirring. After a few minutes, 1.3 grams of carbon disulfide was added and the stirring was continued for about 2 hours. The solution of the reaction product was then poured into denatured ethyl alcohol which precipitated the dextrin xanthate which was washed several times with alcohol and finally ether, thus producing the dextrin xanthate which was used in the operation described below.

The feed (as in Examples 1, 2, 5 and 6) was a 500 gram charge of minus 65 mesh material obtained by grinding an iron oxide tailing obtained from an iron ore washing plant. This feed was conditioned in an aqueous pulp at about 10% solids with the following reagents: Sodium dextrin xanthate 3.25 lbs.; lime 6.0 lbs.; "Liqro" soap 1.0 lb. which was added in stages; all per ton of solids in the pulp which had a pH value of 11.5. The thus conditioned pulp containing about 10% solids was then subjected to froth-flotation treatment resulting in a rougher froth-product high in silica and a machine discharge containing most of the iron minerals. The metallurgical results were as follows:

| Products | Percent Wt. | Percent Fe | Percent SiO₂ | Percent Fe Recovery |
| --- | --- | --- | --- | --- |
| Feed | 100.0 | 27.34 | | 100.0 |
| Froth Product | 60.1 | 7.27 | | 16.0 |
| Machine Discharge | 39.9 | 57.56 | 8.91 | 84.0 |

What is claimed is:

1. The method of concentrating finely-divided oxidized iron ores in which the gangue ingredient is principally siliceous material, which comprises conditioning an aqueous pulp of the ore with an anionic collecting agent selected from the class consisting of higher fatty acids and resin acids and their soaps and mixtures of fatty and resin acids, and with cooperating agents consisting of a calcium compound which is an activator for siliceous material, and with a xanthate of a carbohydrate from the group of carbohydrates consisting of starch, cellulose and dextrin, and subjecting the thus conditioned ore pulp to froth-flotation treatment, thereby producing a froth-product containing most of the siliceous material in the ore and a residue which is an oxidized iron concentrate.

2. The method according to claim 1, employing a sodium starch xanthate.

3. The method of claim 1, employing a potassium starch xanthate.

4. The method of claim 1, employing sodium cellulose xanthate.

5. The method of claim 1, employing sodium dextrin xanthate.

EARL H. BROWN.

REFERENCES CITED

The following references are of record in the file of this patent:

UNITED STATES PATENTS

| Number | Name | Date |
| --- | --- | --- |
| 2,364,777 | Brown et al. | Dec. 12, 1944 |
| 2,415,416 | Clemmer et al. | Feb. 11, 1947 |